US012073976B2

(12) United States Patent
Czyzewski et al.

(10) Patent No.: US 12,073,976 B2
(45) Date of Patent: Aug. 27, 2024

(54) ELECTRIC DEVICE COMPRISING LIQUIDFILLED TANK AND CABLE BOX WITH CURRENT MEASURING DEVICE

(71) Applicant: HITACHI ENERGY LTD, Zürich (CH)

(72) Inventors: Jan Czyzewski, Cracow (PL); Tor Laneryd, Enköping (SE); Johan Dahlgren, Ludvika (SE); Sebastian Seier, Bad Honnef (DE); Nils Lavesson, Lund (SE)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 18/269,034

(22) PCT Filed: Dec. 22, 2021

(86) PCT No.: PCT/EP2021/087290
§ 371 (c)(1),
(2) Date: Jun. 22, 2023

(87) PCT Pub. No.: WO2022/144272
PCT Pub. Date: Jul. 7, 2022

(65) Prior Publication Data

US 2024/0087791 A1 Mar. 14, 2024

(30) Foreign Application Priority Data

Dec. 29, 2020 (EP) .................................... 20217576

(51) Int. Cl.
*H01F 27/12* (2006.01)
*H01F 27/40* (2006.01)
*H01F 38/28* (2006.01)

(52) U.S. Cl.
CPC ....... *H01F 27/12* (2013.01); *H01F 2027/404* (2013.01); *H01F 38/28* (2013.01)

(58) Field of Classification Search
CPC ..... H01F 27/12; H01F 38/28; H01F 2027/404
(Continued)

(56) References Cited

U.S. PATENT DOCUMENTS

2003/0112569 A1* 6/2003 Kato .................... H01H 33/027
361/93.1

FOREIGN PATENT DOCUMENTS

CN 201788801 U 4/2011
CN 102832020 A * 12/2012
(Continued)

OTHER PUBLICATIONS

Chinese Office Action and English Summary, Chinese Invention Patent Application No. 2021800826984, mailed Nov. 8, 2023, 8 pages.

(Continued)

*Primary Examiner* — Tuyen T Nguyen
(74) *Attorney, Agent, or Firm* — Sage Patent Group

(57) ABSTRACT

An electric device includes a tank and a cable box connected to the tank, the tank and the cable box being filled with an insulating liquid electric connection system for connecting a power cable through the cable box to the tank and a current measuring device for measuring electric current in the electric connection system, wherein the current measuring device is located adjacent to a housing of the cable box.

8 Claims, 3 Drawing Sheets

(58) Field of Classification Search
USPC .................................................... 336/55–62
See application file for complete search history.

(56) References Cited

FOREIGN PATENT DOCUMENTS

| | | | |
|---|---|---|---|
| CN | 104425113 | A | 3/2015 |
| CN | 104813175 | A | 7/2015 |
| CN | 110088634 | A | 8/2019 |
| FR | 1100351 | A | 9/1955 |
| JP | S5080429 | A | 6/1975 |
| JP | S55179029 | U | 12/1980 |

OTHER PUBLICATIONS

International Preliminary Report on Patentability, PCT Application No. PCT/EP2021/087290, mailed Mar. 16, 2023, 18 pages.
International Search Report and Written Opinion of the International Searching Authority, PCT/EP2021/087290, mailed Mar. 17, 2022, 18 pages.
K.K. Murty, Fundamentals of Condenser Bushings, Transformers Magazine, Special Edition: Bushings, 2017, 8 pages.
Chinese Office Action, Chinese Application No. 202180082698.4, mailed Mar. 7, 2024, 4 pages.

* cited by examiner

ELECTRIC DEVICE COMPRISING LIQUIDFILLED TANK AND CABLE BOX WITH CURRENT MEASURING DEVICE

CROSS REFERENCE TO RELATED APPLICATIONS

This application is a 35 U.S.C. § 371 national stage application of PCT International PCT/EP2021/087290 filed on Dec. 22, 2021, which claims priority to European Patent Application 20217576.6, filed on Dec. 29, 2020, the disclosures and content of which are incorporated by reference herein in their entireties.

TECHNICAL FIELD

The present disclosure is directed to an electric device comprising a liquid-filled tank and a cable box for electrically connecting a power cable to a functional part of the device located in the tank. The electric device may be an electric transformer, in particular a medium- or high-voltage power or distribution transformer.

BACKGROUND

The publication "Fundamentals of condenser bushings" by K. K. Murty in Transformers Magazine, Special Editions: Bushings, 2017, pages 30 to 37, discloses a power transformer, where an oil-oil condenser bushing crosses a wall between a transformer tank and a cable box. Current transformers are usually located around an extension of the bushing inside the tank. The extension comprises a prolonged grounded electrode inside the bushing, providing a ground potential area which is required for the correct functionality of the current transformer.

Publication documents JP S50 80429 A and CN 201 788 801 U disclose transformer tanks with a cable box, wherein a current measuring device is located at a bushing within the tank. Publication document CN 104 425 113 A discloses a modulating transformer wherein a low-voltage current transformer is located in a tank.

Publication document JP S55 179029 U discloses mounting a bushing current transformer in a radially enlarged wall portion such that a bushing can be easily pulled out for replacement.

Oil-oil bushings are quite heavy and large, which may be a disadvantage for offshore and urban applications, for example. In addition to that, the position of the current transformer and therefore, the measurement is restricted to the position of the bushing.

SUMMARY

It is an object of the present disclosure to provide an improved electric device comprising a current measuring device.

According to a first aspect, an electric device comprises a tank and a cable box connected to the tank, wherein the tank and the cable box are filled with an insulating liquid. The device comprises an electric connection system for connecting a power cable through the cable box to the tank, in particular to a functional part in the tank. The device comprises a current measuring device for measuring electric current in the electric connection system. The current measuring device is located adjacent to a housing, in particular an outer housing, of the cable box. The housing may be electrically conductive and grounded.

The electric connection system provides the current path from the power cable to the functional part. The electric connection system may comprise an electric connector in the cable box and a lead-in of the power cable. The lead-in may be a plug-in system. The lead-in may be partially located inside and partially located outside the cable box.

The current measuring device can be located inside a pocket delimited at least partially by an electrically conductive grounded shield. The shield may be positioned between the electric connection system and the current measuring device. The shield may be arranged circumferentially around the electric connection system.

The grounded shield provides a shielding from the electric field in the cable box and, thus, ensures the correct functionality of the current measuring device. The pocket may Dell not be entirely delimited by the grounded shield but may have an insulating gap. The insulating gap may be an opening allowing liquid to enter the pocket or may be an electrically insulating insert preventing liquid from entering the pocket.

The insulating gap may extend around the whole circumference of the pocket so that current cannot flow from one side of the insulating gap to the other side of the insulating gap. Thereby, current flowing in the walls delimiting the pocket can be prevented. In such a way, a correct measurement of the conductor current may be obtained from the current measuring device.

The electric device may by an induction device, in particular a static induction device, such as a transformer or a reactor. In particular, a transformer may be a medium- or high-voltage power or distribution transformer. The device may be configured to be used in offshore applications, for example. The functional part of the electric device may be positioned in a tank filled with an insulating liquid. The functional part may be an inductive component such as a transformer winding. The insulating liquid may be oil, an isoparaffinic liquid or an ester liquid, for example. The cable box may be configured to be filled with the same insulating liquid as the tank.

The electric device may be a high voltage device, to be used in voltages of at least 30 kV. As an example, in a three-phase device, a phase-to-phase voltage may be 30 kV or more and a phase-to-ground voltage may be 17 kV or more. The device may be a high-voltage static electric induction device.

The current measuring device may comprise one or more current transformers or sensors. The current measuring device may be a Rogowski-based current sensor or an optical current sensor. The current measuring device and, thus, also the pocket may be arranged circumferentially around the electric connector and/or the lead-in. The current measuring device may enclose the electric connection system, in particular the electric connector connecting the power cable to the functional part of the electric device or a lead-in of the power cable. The electric connection may run from a lead-in of the cable box to an interface of a tank in which the functional part is positioned. As an example, the power cable may be connected by a plug-in connection system to the cable box.

The pocket may be located adjacent to a housing, in particular an outer housing, of the cable box. The shield may be a part being mechanically and electrically connected to the housing. The shield may be also integrally formed with the housing. The pocket may have the shape of a hollow cylinder. An outer surface of the cylinder may be provided by the housing of the cable box. An inner surface may be formed by the shield.

The pocket can be arranged at various positions in or at the cable box, enabling current monitoring at a desired location.

In an embodiment, the current measuring device is located in an interface region of the cable box, wherein the interface region is a region of the cable box adjacent to an interface to the tank. The interface region may be a side tube of the cable box, for example.

In a further embodiment, the current measuring device is located in a lead-in region of the cable box, wherein the lead-in region is a region around the location where the power cable is connected to the cable box. The lead-in region is a region inside and outside the cable box.

As an example, the current measuring device near the wall at which the power cable is connected to the cable box. The wall may be a bottom wall of the cable box. The pocket may extend vertically downwards from the bottom wall. The pocket may have an insulating gap in a region opposite the bottom wall, for example.

When the current measuring device is located in a lead-in region of the power cable it may enclose a part of the lead-in or even a part of the power cable arranged outside the cable box. The pocket may be an extension of the cable box in a direction of the power cable. This may enable reducing the dimensions of the cable box.

In an embodiment, the current measuring device may be configured to be immersed in an insulating liquid. The insulating liquid may be the liquid in which the electric connector in the cable box is immersed. The pocket may comprise an insulating gap in front of an opening, through which the liquid can enter the pocket.

In a further embodiment, the current measuring device may be configured to be not immersed in an insulating liquid but to be positioned in a gaseous environment, in particular air. For this aim, the inner volume of the pocket may be separated from the inner volume of a main portion of the cable box by a separator. The separator may be an insulating gap of the pocket. In this case, the pocket may be entirely closed and the wall delimiting the pocket may not have an opening. It is also possible that the pocket is entirely separated from the liquid by a grounded wall portion and the pocket is partially delimited by an insulating wall not in contact with the insulating liquid. As an example, an insulating wall portion may be an insert in the outer housing of the cable box.

In an embodiment, a separate conductor may be attached to a housing of the cable box from outside. An insulating wall portion of the pocket may be formed by an insulating insert in the housing of the cable box.

In embodiments, the cable box may be located at a side wall of the tank. As an example, the cable box may be located near a bottom part of the tank. Such a location has the advantage that the insulating liquid is cooler at the bottom part of the tank and sensitive parts of the cable box may be better protected from high temperatures.

The electric device may be free from an oil-oil bushing at the interface of the tank and the cable box. Instead, an insulating barrier may separate the tank from the cable box. The current measuring device can be positioned in a pocket at a desired position. A device being free from an oil-oil bushing can have a more compact design.

According to a further aspect, a use of the electric device described in the foregoing in offshore or urban applications is disclosed. In both application environments, weight and size of the electric device may be an important factor. Due to the flexible positioning of the current measuring device, the dimensions of the cable box can be minimized. Furthermore, an oil-oil bushing between the interface of the cable box and the tank is not required for positioning the current measuring device. Thereby, the design can have a compact design, particularly useful in offshore or urban applications.

According to a further aspect, a method of manufacturing the cable box as described in the foregoing comprises the steps of determining a position for monitoring current and forming a pocket at a corresponding location at or in the cable box. As an example, when a current is to be monitored at an interface region to the tank, the pocket is formed at an interface region. When a current is to be monitored at a lead-in of the power cable, the pocket is formed in the lead-in region. It is also possible that multiple pockets may be formed in the cable box for positioning multiple current measuring devices at different positions or flexibly positioning a current measuring device in one of the pockets.

Alternatively, the current measuring device may be positioned outside the housing. In this case, a separate conductor may be attached to the housing such that the separate conductor partially encloses the current measuring device.

The present disclosure comprises several aspects. Every feature described with respect to one of the aspects is also disclosed herein with respect to the other aspect, even if the respective feature is not explicitly mentioned in the context of the specific aspect.

BRIEF DESCRIPTION OF THE DRAWINGS

Further features, refinements and expediencies become apparent from the following description of the exemplary embodiments in connection with the figures.

DETAILED DESCRIPTION

Figure 1:
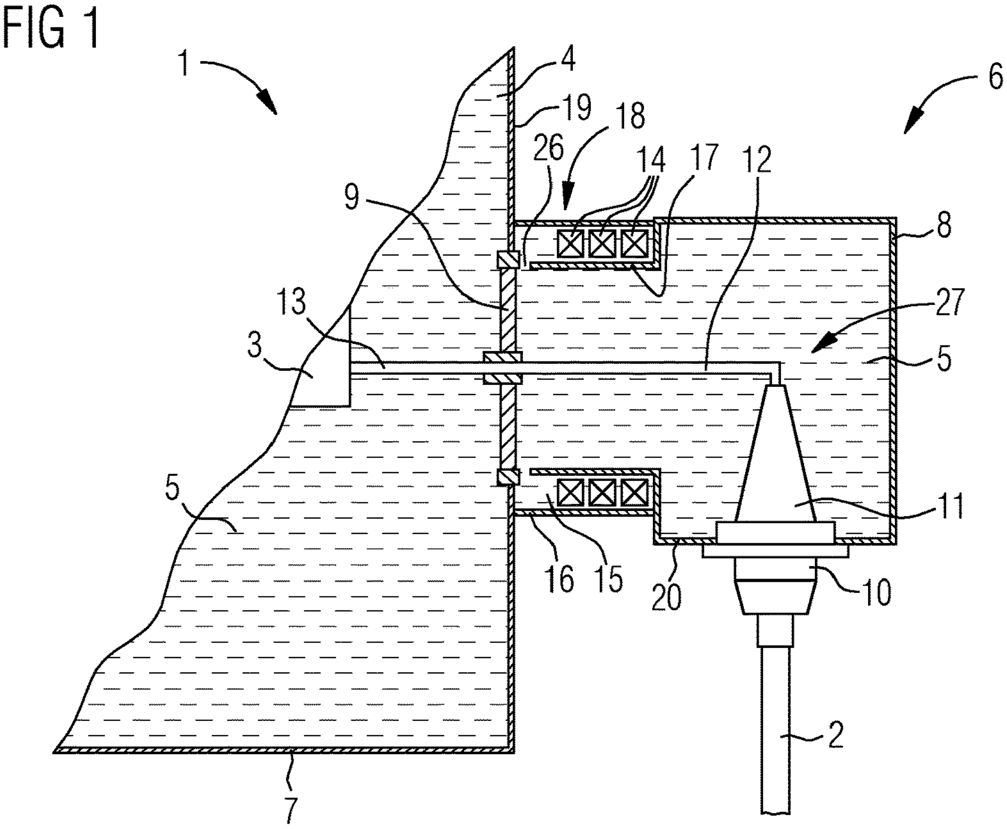
FIG. 1 shows an embodiment of an electric device comprising a cable box in a schematic view.

In the figures, elements of the same structure and/or functionality may be referenced by the same reference numerals. It is to be understood that the embodiments shown in the figures are illustrative and are not necessarily drawn to scale.

FIG. 1 shows an embodiment of an electric device 1 comprising a cable box 6 for connecting an insulated power cable 2 to a functional part 3 of the device 1.

The electric device 1 may be an inductive device such as a power transformer or a reactor, for example. The electric device 1 and the insulated power cable 2 may be configured for medium or high voltages. As an example, the electric device 1 may be used in an offshore wind power collecting and/or distributing station.

The functional part 3 is positioned in a tank 4 filled with an insulating liquid 5. The insulating liquid 5 may be oil, in particular mineral oil. The insulating liquid 5 may be alternatively an isoparaffinic liquid or an ester liquid.

The electric connection system 27 from the power cable 2 to the functional part 3 runs through the cable box 6 which is also filled with the dielectric liquid 5. The electric connection system 27 comprises an electric connector 12 and a lead-in 10. The inner volume of the cable box 6 is separated from the inner volume of the tank 4 such that the insulating liquid 5 can be independently drained from the cable box 6 while the insulating liquid 5 in the tank 4 is retained.

Such an independent draining of the cable box 6 allows replacement of components in the cable box 6 and/or carrying out testing routines. As an example, the cable box 6 may have an opening (not shown here) for installing a test cable or other components after draining the device. Temporary connection arrangements may be made such as installing an oil-air-bushing for factory acceptance tests or disconnecting the insulated power cable 2 to connect testing equipment to the cable end in the field. After or before the test routine, the cable box 6 may be refilled with the insulating liquid 5.

The cable box 6 may be integrally formed with the tank 4 such that a housing 8 of the cable box 6 is integrally formed with a housing 7 of the tank 4. Both housings 7, 8 may be outer housing. Alternatively, the cable box 6 may be separately manufactured and attached to the tank 4.

For separating the fluid volumes between tank 4 and cable box 6, an insulating barrier 9 is located between the inner volumes of the tank 4 and the cable box 6. The insulating barrier 9 is a liquid tight separation between the cable box 6 and the tank 4. The insulating barrier 9 may also provide a gas tight separation.

The insulating barrier 9 is formed as a wall. The insulating barrier 9 comprises electrically insulating material, such as pressboard material, for example. The insulating barrier 9 may extend along most of the interface area. In embodiments, the insulating barrier 9 may extend along the entire interface area. The diameter of the insulating barrier 9 is chosen so as to provide dielectric withstand to the operating and testing voltages of the connection. By using such an insulating barrier 9, an oil-oil bushing between the cable box 6 and the tank 4 may not be required.

An oil-oil bushing is a complex device of large size and weight. In cases where the size and weight of the electric device matters, like, e.g., in offshore applications, an oil-oil bushing may be a disadvantage. This may be also the case for urban applications. An oil-oil bushing is also a device of limited operating temperature. The temperature of the insulating liquid 5 in operation of the electric device 1 has to be restricted below that value which poses a limitation of a power load set on the electric device. Accordingly, by providing an electric device 1 in which an oil-oil bushing is not present, weight and size can be reduced. Furthermore, the electric device 1 is less sensitive to high temperatures of the insulating liquid 5 in the tank. This enables to operate the electric device 1 at high temperatures of the insulating liquid 5 and, thus, under overload of higher power. Due to the increase of the allowed temperature limits, an ester insulating liquid 5 can be used.

The insulated power cable 2 may be electrically connected to the cable box 6 by a plug-in connection. In particular, the insulated power cable 2 may be connected to or may extend into a lead-in 10. The lead-in 10 may comprise a plug-in connection to be plugged into a socket 11 of the cable box 6.

An electric connector 12 leads through the cable box 6 from the socket 11 to the tank 4. In particular, the electric connector 12 is guided through the insulating barrier 9 and is connected to a lead 13 leading to the functional part 3 of the electric device 1. As an example, the lead 13 may be a winding lead of the electric device 1 or may be connected to a winding lead. It is also possible that the electric connector 12 is integrally formed with the lead 13. A current path provided by the electric connection system 27 is formed by the power cable 2, the connecting elements of the lead-in 10, the electric connector 12 and the lead 13 runs from the power cable 2 to the functional part 3.

The electric device 1 comprises a current measuring device 14. The current measuring device 14 may comprise one or more current transformers or current sensors, for example.

A stack of current transformers and/or sensors may be used. As an example, the current transformers and/or sensors may have different characteristics for measuring different parameters. The current measuring device 14 may also comprise only a single current transformer or a single current sensor.

A current transformer or sensor may comprise a core around which a winding is wound. The core encloses a part of the electric connection system 27 through which the current flows. The current induces a current in the winding of the current transformer. A current sensor may be a Rogowski-based current sensor or an optical current sensor, for example.

The current measuring device 14 may be used for measuring the electric current flowing through the connector 12. Thereby, failures such as short circuits may be detected. As an example, the current measuring device 14 may be used in a differential protection system for the electric device, in which input and output currents of the device are compared. In case of inconsistencies, electric circuit breakers may be activated.

In the shown embodiment, the current measuring device 14 is positioned close to the housing 8 of the cable box 6. The current measuring device 14 is located in an interface region 18 of the cable box 6, adjacent to the interface to the tank 4. This interface region 18 is a tube located at a side of a main part of the cable box 6 in which the lead-in 10 and socket 11 is positioned. Accordingly, the current measuring device 14 is positioned such that a current inside the electric connection system 27 close to the interface to the tank 4 can be monitored.

A pocket 15 filled with the insulating liquid 5 is delimited by a section 16 of the housing 8 at one side and by an additional shield 17 at the other side. The additional shield 17 also delimits the pocket 15 at a third side. The shield 17 is mechanically and electrically connected to the housing 7 or is integral with the housing 7.

The pocket 15 extends circumferentially inside the cable box 6 and is limited at an outer side by the housing 8. The pocket 15 has the shape of a hollow cylinder. The current measuring device 14 is positioned in the pocket 15.

The shield 17 is electrically conductive and on the same potential of the outer housing 8, i.e., grounded. The shield 17 may comprise a metal. The shield 17 may be of the same material as the housing 8. The shield 17 is electrically connected to the housing 8 only on one of its end. The other end of the shield 17 is not connected to the housing 8.

Accordingly, the pocket 15 is not entirely enclosed by conductive walls but has an insulating gap 26. In that way, the whole return current of the power cable flows through the housing 8 of the cable box 6, outside the area enclosed by the current measuring device 14. In particular, current does not flow through the shield 17, which could affect the measurement by the current measuring device 14. By the shield 17, the current measuring device 14 is screened from the surrounding electric field.

The size of the pocket 15 is adapted to the size of the current measuring device 14 such that the pocket 15 is not much larger than the current measuring device 14. As an example, the distance from the current measuring device 14 to the walls of the pocket 15 may be not larger than the dimension of the current measuring device 14 in the direction of the wall. This ensures that the shield 17 is positioned close to the current measuring device 14.

The electric field generated by the high-voltage potential of the electric connector 12 extends between the electric connector 12 and the side of the electric shield 17 directed away from the pocket 15, thus not entering into the area where the current measuring device 14 is positioned. The diameter of the shield 17 is chosen such that the insulation by the insulating liquid 5 between the electric connector 12 and the shield 17 withstands the voltage of the electric connector 12. The smooth internal surface of the grounded shield 17 provides optimal local distribution of the electric field, thus maximizing withstanding voltage.

In the shown embodiment, the cable box 6 is positioned at a side wall 19 of the tank 4. The cable box 6 is positioned at a lower part of the tank 4, where the temperature of the insulating liquid 5 is lower than at a top part of the tank 4. Thereby, the temperature during operation of temperature-sensitive parts like the cable plug-in connection and the cable 2 can be limited.

The insulated power cable 2 is led out or in at bottom wall 20 of the cable box 6. The cable box 6 has the shape of a vertically positioned cylinder.

Figure 2:
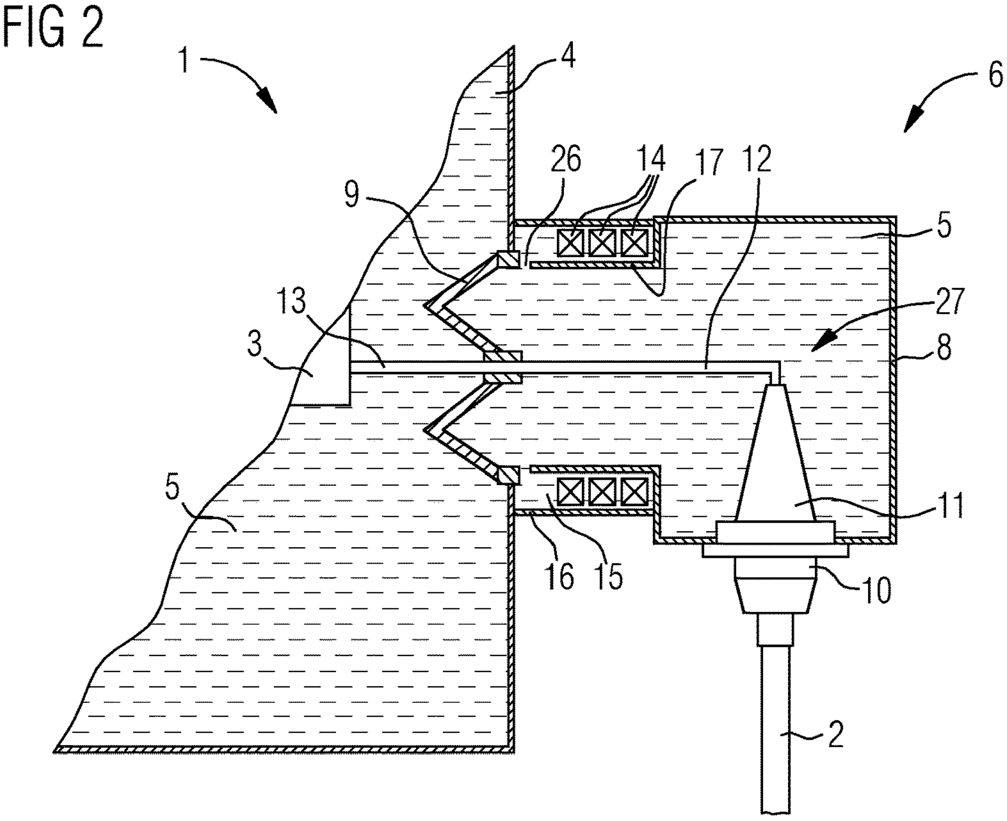
FIG. 2 shows a further embodiment of an electric device comprising a cable box in a schematic view.

FIG. 2 shows a further embodiment of an electric device 1 comprising a cable box 6 similar to the embodiment of FIG. 1. In FIG. 2, however, the insulating barrier 9 has a profiled structure to increases the creepage length, thus improving the electrical insulation properties of the barrier. In particular, the insulating barrier 9 has bellows. The insulating barrier 9 may be of a Faltenbalg-type.

Figure 3:
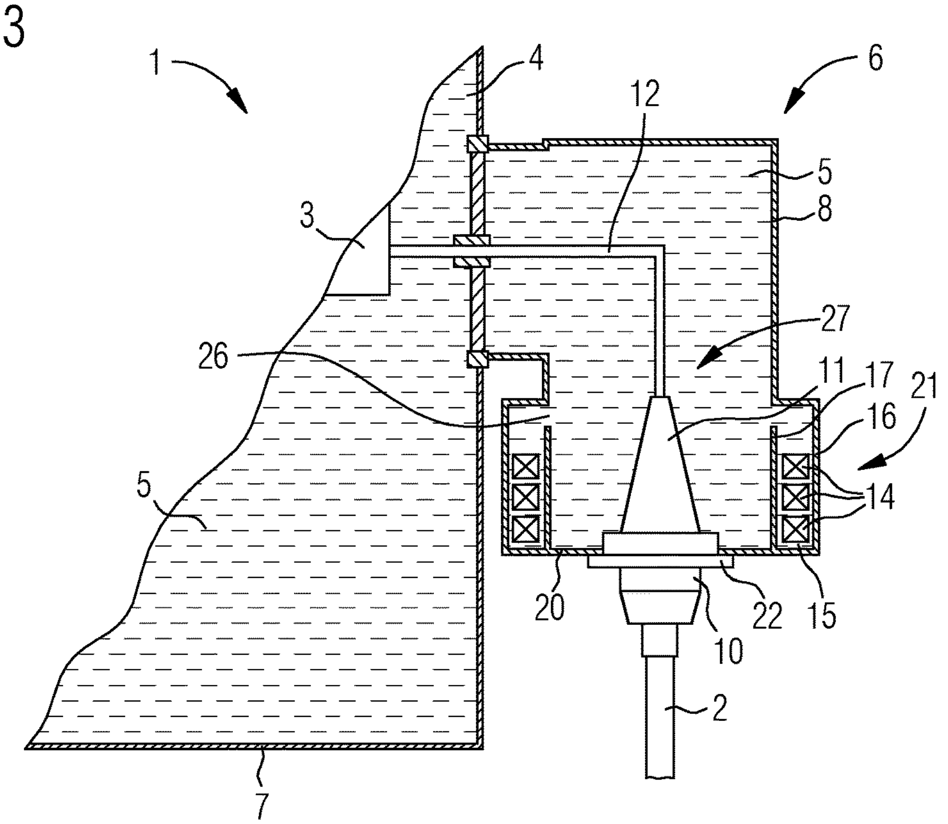
FIG. 3 shows a further embodiment of an electric device comprising a cable box in a schematic view.

FIG. 3 shows a further embodiment of an electric device 1 comprising a cable box 6. Compared to FIG. 1, the current measuring device 14 is positioned in a lead-in region 21 of the cable box 6, in which the current path enters the cable box 6.

The grounded shield 17 is located around an insulating well of the socket 11 of the lead-in 10. The grounded shield 17 is connected to a housing 8 of the cable box 6 at its lower end, with the upper end not connected. Alternatively, the upper end may be connected and the lower end disconnected.

By positioning the current measuring device 14 in the lead-in region 21, where the current path enters the cable box 6, a differential protection of the electric device 1 is sensitive not only to fault currents inside the tank 4, but also to fault currents in the cable box 6. This enables a fast switching off of the electric device 1 also in case of a short circuit occurring in the cable box 6.

In this embodiment, the lead-in region 21 is a region at the bottom part of the cable box 6. Positioning the current measuring device 14 in the bottom part allows reducing the lateral extension of the cable box 6 compared to the embodiments of FIGS. 1 and 2.

Figure 4:
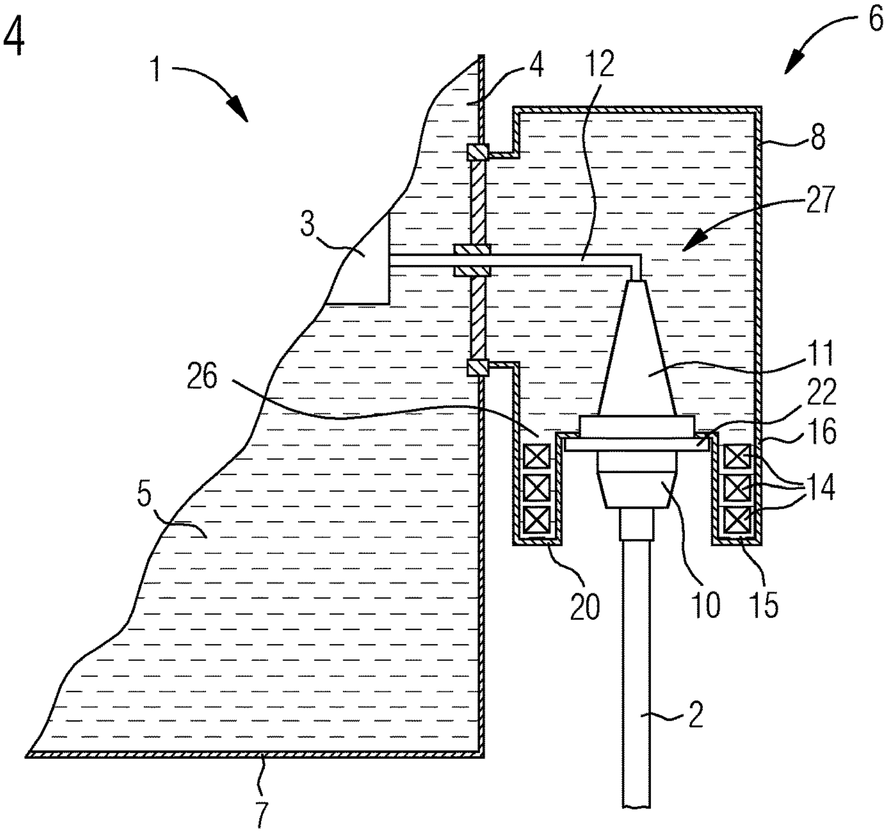
FIG. 4 shows a further embodiment of an electric device comprising a cable box in a schematic view.

FIG. 4 shows a further embodiment of an electric device 1 comprising a cable box 6. In difference to the embodiment of FIG. 3, the current measuring device 14 is positioned such that it encloses a section of the lead-in 10 and power cable 2 arranged outside the cable box 6. In particular, the current measuring device 14 is positioned at and below a flange 22 of the plug-in system.

The current measuring device 14 is located in a pocket 15 formed entirely by sections 16 of the housing 8 of the cable box 6. The pocket 15 is an extension of the housing 8 of the cable box 6 extending in a direction of the outgoing power cable 6, in particular downwards.

In this embodiment the current measuring device 14 is screened from the electric field generated by the high-voltage potential of the current path by the grounded enclosure of the lead-in 10. In that way, the diameter of the current measuring device 14 may be of a diameter only slightly larger than the flange 22 of the socket 11, this diameter being typically much smaller than the diameter of the cable box 6, being large enough to prevent an electric flashover between the current path and the housing 8 of the cable box 6. The small diameter of the current measuring device 14 is advantageous in that case.

In addition to that, the shown positioning of the current measuring device 14 enables monitoring the current at a lead-in region 21 of the power cable 2 at the outside of the cable box 6. This makes the differential protection more sensitive to faults not only in the cable box 6 but also inside the cable lead-in 10, especially those occurring close to its bottom part outside the cable box 6. Fast detection of a fault in the cable box 6 or in the cable lead-in 10 by the current measuring device 14 and, in particular, by a differential protection system, and early switching off of the electric device 1 allows for confining effects of a fault to the cable box 6, before such effects propagate into the tank 4, which may cause significant damage to the functional part 3. Such faults may comprise damages from arc, pressure burst or fire, for example.

Figure 5:
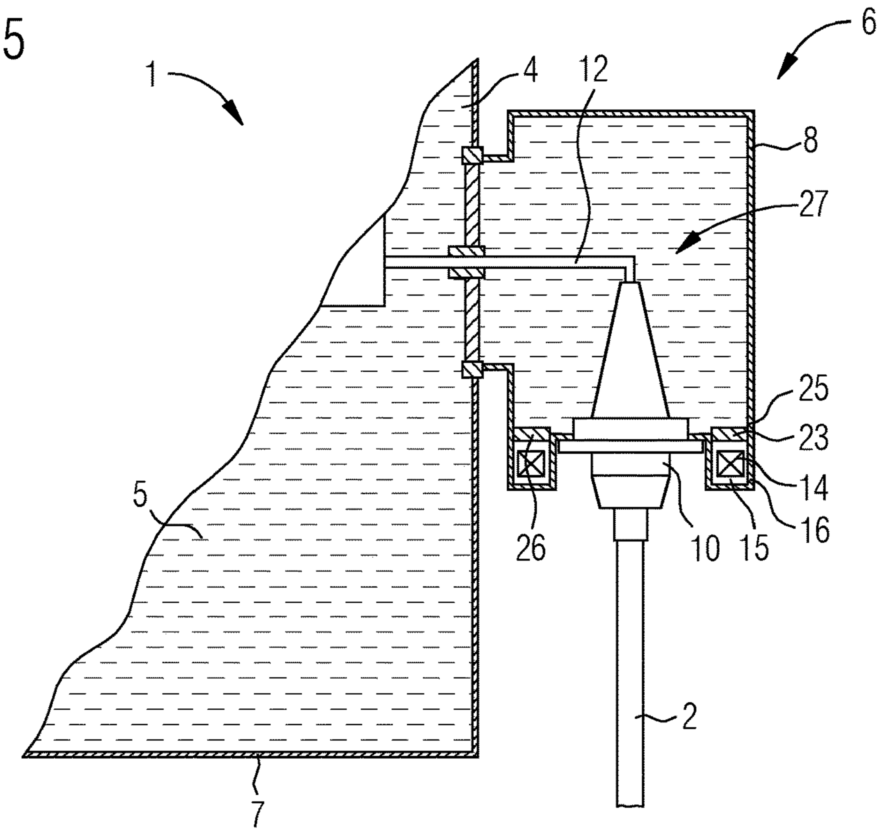
FIG. 5 shows a further embodiment of an electric device comprising a cable box in a schematic view.

FIG. 5 shows a further embodiment of an electric device 1. In difference to the embodiments of FIGS. 1 to 4, the current measuring device 14 is not immersed in the insulating liquid 5 but positioned in a gaseous environment, in particular air.

The inner volume of the pocket 15 is separated from the main volume of the cable box 6 by a separator 23. The separator 23 is liquid-tight such that the insulating liquid 5 is prevented from entering the pocket 15, where the current measuring device 14 is positioned. The grounded pocket 15 thereby also protects the current measuring device 14 from negative impacts of the insulating liquid 5.

The separator 23 also forms an insulating wall 25 delimiting the pocket 15. The separator 23 is electrically insulating, not allowing the return current of the power cable 2 to flow directly from the enclosure of the lead-in 10 to the housing 8 of the cable box 6, which would be through the area enclosed by the current measuring device 14, and thus would affect its measurement. The electrically conductive walls of the pocket 15 lead the return current outside the orifice of the current measuring device 14.

Furthermore, the current measuring device 14 comprises only a single current sensor or transformer such as an optical current sensor or a Rogowski coil, for example. Alternatively, also several current transformers or sensors may be provided.

Figure 6:
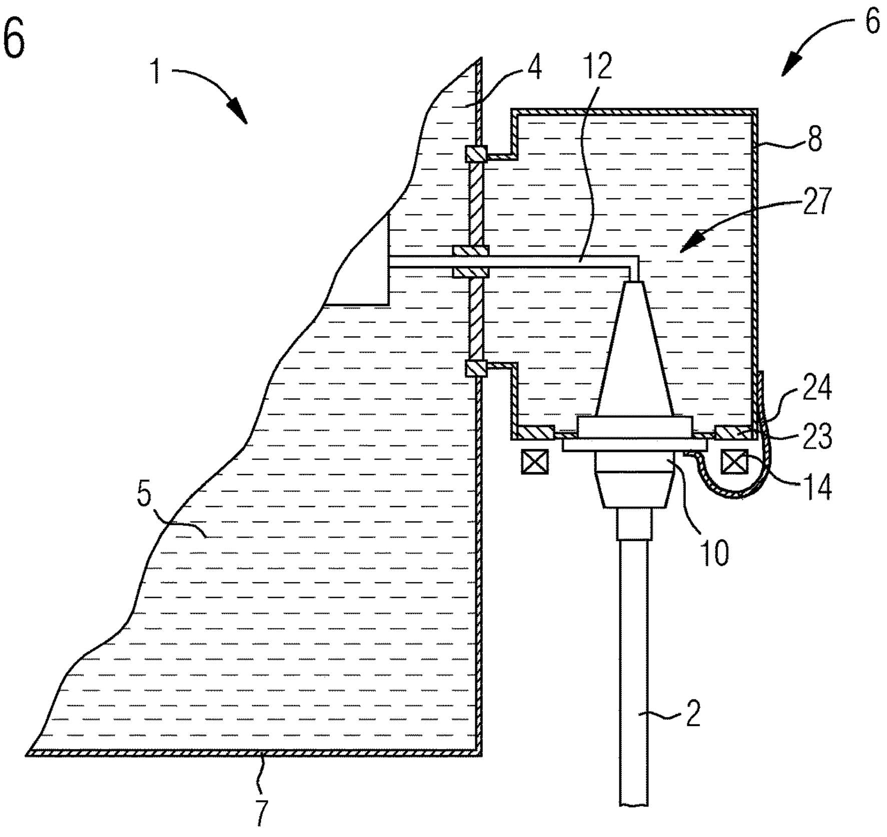
FIG. 6 shows a further embodiment of an electric device comprising a cable box in a schematic view.

FIG. 6 shows a further embodiment of an electric device 1 comprising a cable box 6. In difference to the embodiment of FIG. 5, the current measuring device 14 is located outside the housing 8 of the cable box 6.

Furthermore, the return current of the power cable 2 is lead through a separate conductor 24 attached to the housing 8 on one end and to the flange 22 of the socket 11 or the enclosure of the lead-in 10, on the other end. The conducting piece 24 may have the shape of a clip. The conducting piece 24 does not fully enclose the current measuring device 14.

As in FIG. 5, an electrically insulating separator 23 prevents the return current to flow through the orifice of the current measuring device 14. The electrically insulating separator 23 is an insert in the housing 8 and runs circumferentially around the lead-in 10.

Various positions of the arrangement of the current measuring device 14 and the separate conductor 24 are possible, with the cable 2 running through the orifice of the current measuring device 14 and the conducting piece 24 being attached at an outer side of the housing 8.

It is also possible that multiple current measuring devices 14 at different positions at or in the cable box 6.

REFERENCE NUMERALS

1 electric device
2 power cable
3 functional part
4 tank
5 insulating liquid
6 cable box
7 housing of tank
8 housing of cable box
9 insulating barrier
10 lead-in
11 socket
12 electric connector
13 lead
14 current measuring device
15 pocket
16 section of outer housing
17 shield
18 interface region of cable box
19 side wall of tank
20 bottom wall of cable box
21 lead-in region
22 flange
23 separator
24 separate conductor
25 insulating wall
26 insulating gap
27 electric connection system

The invention claimed is:

1. An electric device, comprising:

a functional part, a tank and a cable box connected to the tank, the tank and the cable box being filled with an insulating liquid, the functional part being positioned in the tank, an electric connection system for connecting a power cable through the cable box to the functional part in the tank, and a current measuring device for measuring electric current in the electric connection system, wherein the cable box comprises a housing, wherein the current measuring device is located adjacent to the housing of the cable box, wherein the cable box comprises a pocket and an electrically conductive grounded shield, wherein the pocket is delimited at least partially by the electrically conductive grounded shield located in the cable box, wherein the current measuring device is located in the pocket, wherein the electrically conductive grounded shield is arranged circumferentially around a portion of the electric connection system and a portion of the insulating liquid and is positioned between the portion of the electric connection system and the current measuring device in a direction radially outwards from the portion of the electric connection system, wherein the shield is mechanically and electrically connected to the housing or integrally formed with the housing.

2. The electric device of claim 1, wherein the current measuring device is immersed in the insulating liquid.

3. The electric device of claim 1, wherein the current measuring device is located in an interface region of the cable box, adjacent to an interface to the tank.

4. The electric device of claim 1, wherein the current measuring device is located in a lead-in region of the cable box adjacent to a location where the power cable is connected to the cable box.

5. The electric device of claim 1, wherein a volume of the cable box is separated from a volume of the tank by an insulating barrier formed as a wall.

6. The electric device of claim 1, being a transformer or a reactor.

7. The electric device of claim 1, wherein the cable box is located on a lower part of the tank where the temperature during operation is lower than at a top part of the tank.

8. A use of the electric device of claim 1 in an offshore wind power collecting and/or distributing station.

* * * * *